United States Patent
Park et al.

(10) Patent No.: US 8,024,072 B2
(45) Date of Patent: Sep. 20, 2011

(54) METHOD FOR SELF-LOCALIZATION OF ROBOT BASED ON OBJECT RECOGNITION AND ENVIRONMENT INFORMATION AROUND RECOGNIZED OBJECT

(75) Inventors: Sung Kee Park, Seoul (KR); Soon Yong Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 427 days.

(21) Appl. No.: 12/292,715

(22) Filed: Nov. 25, 2008

(65) Prior Publication Data

US 2009/0210092 A1    Aug. 20, 2009

(30) Foreign Application Priority Data

Feb. 15, 2008   (KR) .................... 10-2008-0013832

(51) Int. Cl.
*G05B 15/00*   (2006.01)
(52) U.S. Cl. .................................................... 700/259
(58) Field of Classification Search .............. 700/245, 700/251, 259, 253, 260, 261
See application file for complete search history.

(56) References Cited

U.S. PATENT DOCUMENTS 7,337,040 B2 *   2/2008   Takenaka et al. ............ 700/245
2007/0276541 A1   11/2007   Sawasaki

FOREIGN PATENT DOCUMENTS

| JP | H7-200777 | 8/1995 |
|---|---|---|
| JP | 2006209644 | 8/2006 |
| JP | 2007-316966 | 12/2007 |
| JP | 2008-14742 | 1/2008 |

OTHER PUBLICATIONS

Office Action issued in Japanese Patent Application No. 2008-335345, dated May 31, 2011, 3 pages.

* cited by examiner

*Primary Examiner* — Kim T Nguyen
(74) *Attorney, Agent, or Firm* — Bacon & Thomas PLLC

(57) ABSTRACT

A method for self-localization of a robot, the robot including a camera unit, a database storing a map around a robot traveling path, and a position arithmetic unit estimating the position of the robot, includes: acquiring an image around the robot, in the camera unit. Further, the method includes recognizing, in the position arithmetic unit, an individual object in the image acquired by the camera unit, to generate position values on a camera coordinate system of local feature points of the individual objects and local feature points of a surrounding environment including the individual objects; and estimating, in the position arithmetic unit, the position of the robot on the basis of the map and the position values on the camera coordinate system of local feature points of the individual objects and local feature points of a surrounding environment including the individual objects.

12 Claims, 9 Drawing Sheets

METHOD FOR SELF-LOCALIZATION OF ROBOT BASED ON OBJECT RECOGNITION AND ENVIRONMENT INFORMATION AROUND RECOGNIZED OBJECT

FIELD OF THE INVENTION

The present invention relates to a method for self-localization of a mobile robot under an operation with a predetermined reference coordinate, and in particular, to a method for self-localization of a mobile robot, which recognizes each individual objects in an environment by using a vision sensor, and analyze recognized objects and environment information around the recognized objects on the basis of a predetermined map to perform self-localization.

BACKGROUND OF THE INVENTION

Robots, which have been used as industrial robots, are increasingly applied as intelligent robots that can be operated in any environment. Examples of the intelligent robots include a cleaning robot, a guard robot, a hazardous material detection robot, a domestic assistant robot, and an education robot. In order for such a robot to provide a service to people, robot navigation technologies need to be ensured. Among them, a self-localization technology for self-localization of a robot is particularly important.

Self-localization is based on a map, and accordingly various changes may be made in accordance with how the map representation to be used by the robot is constructed and what sensor is used. Recent development of associated technology focuses on a combination of a numerical map, such as a lattice map, and a topological map, and a vision sensor, instead of a laser or ultrasonic sensor. This is because the vision sensor is increasingly used in that it can provide abundant additional information, such as color, object, and human recognition, based on distance information and images.

In the related art, self-localization of a robot based on object recognition technology using a vision sensor is as follows.

Examples of the related art are Korean Patent Laid-open Application No. 10-2006-0102389, in which an active tag is attached to an object and is recognized by a vision sensor, to thereby obtain the positions of the object and the robot, and Korean Patent Laid-open Application No. 10-2005-0062713, a position control system of a mobile robot based on vision. However, in Korean Patent Laid-open Application No. 10-2006-0102389, it is inconvenient in that an artificial tag is attached to an object on a traveling path of a robot. In addition, in Korean Patent Laid-open Application No. 10-2005-0062713, a vision sensor is attached to the environment, not the robot, and accordingly the robot is only recognized, whereby position estimation is performed. For this reason, a vision sensor is needed in accordance with an environment, and as a result, a plurality of vision sensors.

Another example of the related art is U.S. Pat. No. 7,015,831 in which self-localization and map implementation are performed simultaneously. In U.S. Pat. No. 7,015,831, while recognition using a vision sensor is not performed in an object unit, three-dimensional local feature points are extracted, and self-localization is performed based on the extracted local feature points. Accordingly, there is no countermeasure against a subsequent change in the environment, and it becomes problematic, like a case where a laser sensor is used.

Examples of the papers as the related art are as follows.

Yuta et al have suggested a method that constructs a topological map around an object based on object recognition, and estimates the position of the robot by recognizing an object one by one and then recognizing another object while moving the robot (M. Tomoyo and S. Yuta, "Object-based Localization and Mapping Using Loop Constraints and Geometric Prior Knowledge," International Conference on Robotics and Automation, pp. 862 to 867, 2003). This method is related to local localization tracking in a method for self-localization of a robot. However, there is a problem in that it may not be applied to global self-localization for new estimation of the position of the robot when the robot is unexpectedly moved to any position or when local position estimation is failed.

Park et al have suggested a method that represents an indoor environment as a topological map around a local area, recognizes an object in each local area to acquire a local area where the robot is located, and calculate the position of the robot from a local coordinate system defined in the local area (S. Park, M. Park, and S. K. Park, "Vision-based Global Localization for Mobile Robots with an Object Entity-based Hybrid Map," International Conference on Advanced Robotics, pp. 761 to 766, 2007). In this method, the position of the robot is calculated by using only three-dimensional information of the recognized object. Accordingly, when the three-dimensional of the recognized object is insufficient, the position may be inaccurately calculated.

SUMMARY OF THE INVENTION

In view of the above, the present invention provides a method for self-localization of a robot that, in a state where an object and environment information around the object for environment recognition of the robot are stored in the form of a topological map, together with three-dimensional information, recognizes an object in the environment by a vision sensor, and when an object is recognized, performs self-localization of the robot by using the object and three-dimensional information of the environment around the object.

Further, the present invention provides a method for self-localization of a robot in which, on an assumption that an object recognition time by a vision sensor is rarely applied to position estimation while the robot is traveling, the robot recognizes an individual object in an environment, position estimation is performed on the recognized object and global position estimation is performed at a position where the robot is stationary.

In accordance with a first aspect of the invention, there is provided a method for self-localization of a robot, the robot including a camera unit formed of a stereo video device, a database storing a map around a robot traveling path, and a position arithmetic unit estimating the position of the robot on the basis of image information acquired by the camera unit. The method includes: acquiring an image around the robot in the camera unit; recognizing, in the position arithmetic unit, an individual object in the image acquired by the camera unit, to generate position values on a camera coordinate system of local feature points of the individual objects and local feature points of a surrounding environment including the individual objects; and estimating, in the position arithmetic unit, the position of the robot on the basis of the map stored in the database and the position values on the camera coordinate system of local feature points of the individual objects and local feature points of a surrounding environment including the individual objects.

Estimating the position of the robot may include: selecting nodes, on which at least recognized object is included, from the map stored in the database as candidate nodes, wherein the robot can be located on the candidate node; calculating temporary positions of the robot for all the candidate nodes on the basis of the position values; and applying particle filtering to each candidate node with the calculated temporary position as an initial position value to estimate the position of the robot.

Further, estimating the position of the robot may include selecting nodes, on which at least recognized object is included, from the map stored in the database as candidate nodes, wherein the robot can be located on the candidate node; calculating temporary positions of the robot for all the candidate nodes on the basis of the position values; selecting a final candidate node from among the candidate nodes; and applying particle filtering to the final candidate node with the temporary position of the robot for the final candidate node as an initial position value to estimate the position of the robot.

In accordance with a second aspect of the invention, there is provided a method for self-localization of a robot, the robot including a camera unit formed by a stereo video device having a viewing angle smaller than 360°, a rotating device rotating the camera unit by a predetermined angle, a database storing a map around a robot traveling path, and a position arithmetic unit estimating the position of the robot on the basis of image information acquired by the camera unit. The method includes: acquiring, in the camera unit, an image around the robot in a predetermined direction; when no object is recognized in the image acquired by the camera unit, rotating, in the position arithmetic unit, the camera unit and repeatedly acquiring an image in another direction until an object is recognized in the acquired image, and generating position values on a camera coordinate system of the local feature points of the recognized individual objects and the local feature points of the surrounding environment including the individual objects; selecting, in the position arithmetic unit, nodes on which at least recognized object is included, from the map stored in the database as candidate nodes, wherein the robot can be located on the candidate nodes; giving a priority to each candidate node by the position arithmetic unit; calculating, in the position arithmetic unit, a distance between objects on said each candidate node and the robot, and a highest priority object; confirming, in the position arithmetic unit, the highest priority object on said each candidate node by rotating the camera unit; and applying particle filtering to the respective candidate nodes having confirmed highest priority objects, thereby estimating the position of the robot, in the position arithmetic unit.

Further, estimating the position of the robot may include, if a highest priority object in a candidate node is not recognized, confirming a highest priority object of a next highest priority candidate node from among the candidate nodes according to the given priority.

With the method for self-localization of a robot based on object recognition and the environment around a recognized object according to the aspects of the invention, individual objects in the environment are recognized by a stereo vision sensor, and three-dimensional information regarding the individual objects and three-dimensional information regarding the environment around the individual objects are used together. Therefore, accurate position estimation can be achieved. In addition, even in an environment where many objects (for example, people, chairs, or the like) are re-located, accurate position estimation can be achieved.

BRIEF DESCRIPTION OF THE DRAWINGS

The above and other features of the present invention will become apparent from the following description of an embodiment given in conjunction with the accompanying drawings, in which.

DETAILED DESCRIPTION OF THE EMBODIMENT

Hereinafter, a system and method for self-localization of a robot based on object recognition and environment information around a recognized object in accordance with an embodiment of the present invention will be described with reference to the accompanying drawings which form a part hereof.

Figure 1:
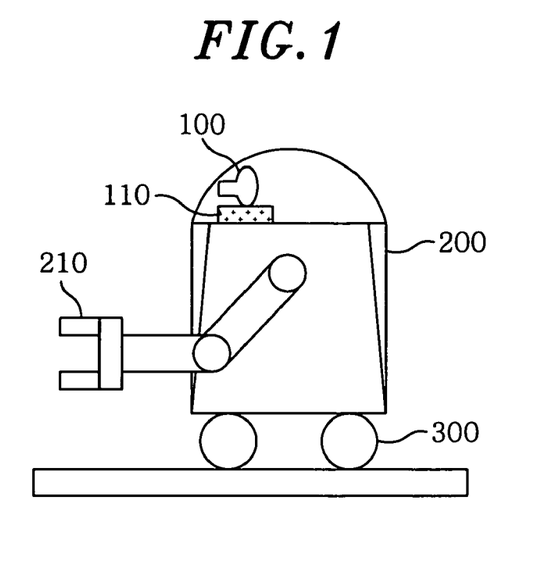
FIG. 1 is a structural diagram of a robot, which performs self-localization based on object recognition and environment information around a recognized object, in accordance with the present invention.

FIG. 1 is a structural diagram of a robot, which performs self-localization based on object recognition and environment information around a recognized object, in accordance with the present invention.

As shown in FIG. 1, the robot, which performs self-localization based on object recognition and environment information around a recognized object in accordance with the present invention, includes a camera unit 100, a robot body 200 and a robot moving unit 300.

The camera unit 100 is used to estimate the position of the robot, and formed of a stereo image input device.

The camera unit 100 may have a camera having a viewing angle in a predetermined range, or may have a camera having an omni-directional viewing angle. When a camera having a viewing angle in a predetermined range is used, as shown in FIG. 1, a pan/tilt device 110 for rotating the camera by a predetermined angle is further provided to rotate the camera, such that an omni-directional image can be input.

The pan/tilt device 110 is a rotating device that can execute panning, which is a rotation operation left and right in a horizontal direction, and tilting, which is a nod operation up and down.

The robot body 200 is provided with manipulators 210, which are mechanical arms for external operations, at its outer surface. The robot body 200 includes a database (not shown) that stores a map around a robot traveling path, and a position arithmetic unit (not shown) that compares image information input from the camera unit 100 with the map stored in the database to recognize an object and estimates the position of the robot.

The map stored in the database is produced beforehand in the form of a topological map. The three-dimensional position of each object on the map and the three-dimensional positions of local feature points in the environment around each object are stored.

The robot moving unit 300 moves the robot along a traveling path. As the robot moving unit 300, any device, including a wheel or a caterpillar, may be used insofar as it can move the body of the robot.

Figure 2:
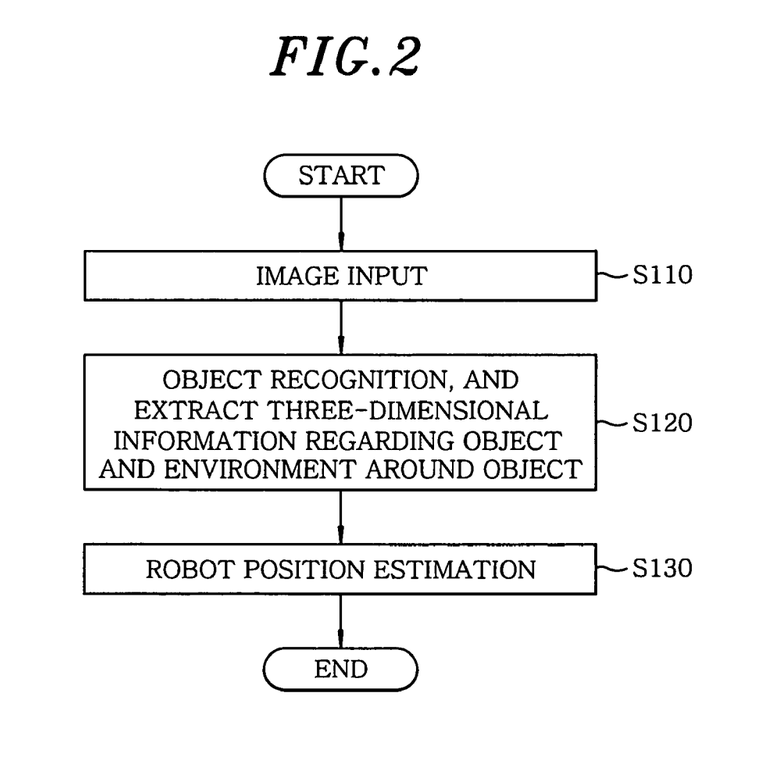
FIG. 2 is a basic flowchart illustrating a method for self-localization of a robot based on object recognition and environment information around a recognized object in, accordance with the present invention.

FIG. 2 is a basic flowchart illustrating a method for self-localization of a robot based on object recognition and environment information around a recognized object in accordance with the present invention.

As shown in FIG. 2, a method for self-localization of a robot based on object recognition and environment information around a recognized object includes: receiving an image from the camera unit 100 (hereinafter, referred to an image input step S110; recognizing individual objects in the image input in the image input step S110 and generating information regarding the three-dimensional positions of the individual objects and the three-dimensional positions of local feature points in the environment around each object (hereinafter, referred to as an object recognition and information extraction step S120); and estimating the position of the robot based on a pre-registered object-based map by using the information extracted in the object recognition and information extraction step S120 (hereinafter, referred to as a robot position estimation step S130). Therefore, in accordance with the present invention, the individual objects in the environment are first recognized, and three-dimensional distance information regarding an object and environment around the recognized object is extracted, thereby estimating the position of the robot.

In accordance with the present invention, object recognition is performed using a collection of local feature points.

The object recognition is performed by extracting the local feature points from the environment image acquired by the camera unit 100, and comparing the feature points with the local feature points of an object model stored in the database.

Figure 3:
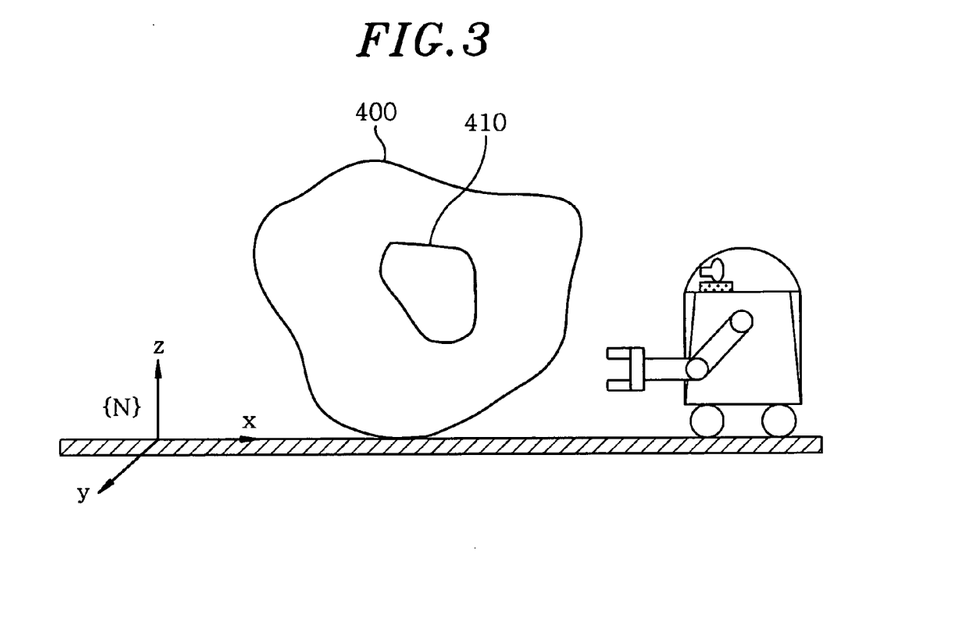
FIG. 3 is a conceptual view of objects recognized by a robot and the environment around the recognized object in accordance with the present invention.
Figure 4:
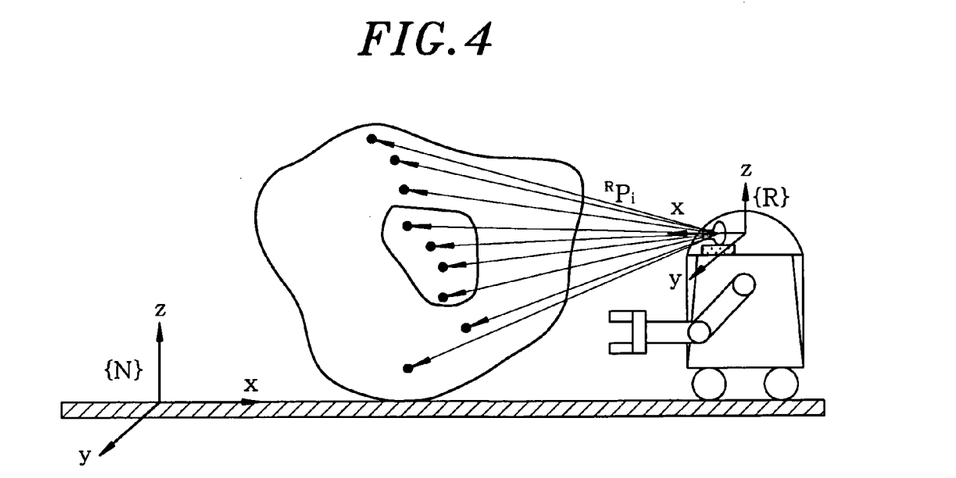
FIG. 4 is a conceptual view of robot-oriented object recognition, object position, and environment around a recognized object in accordance with the present invention.
Figure 5:
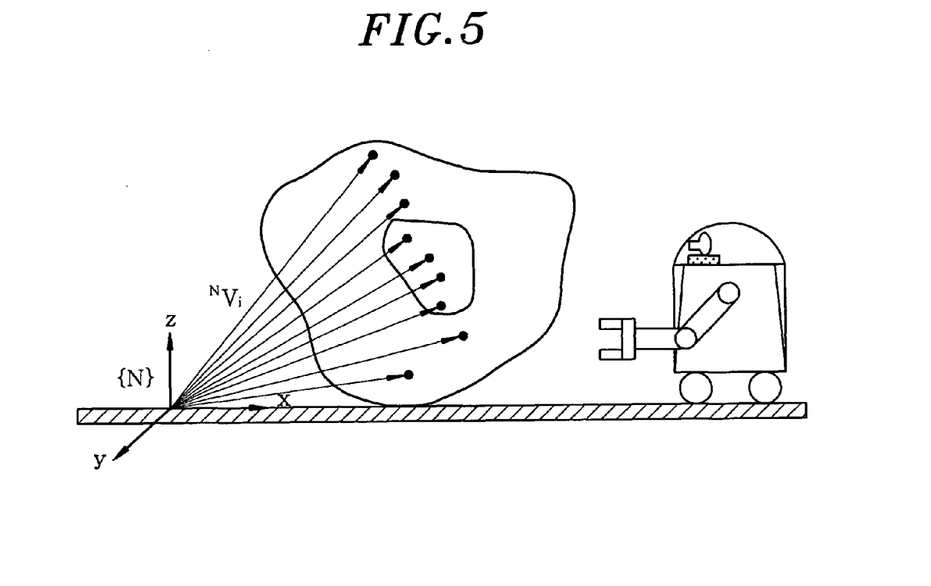
FIG. 5 is a conceptual view of environment-oriented object position and environment around an object in accordance with the present invention.
Figure 6:
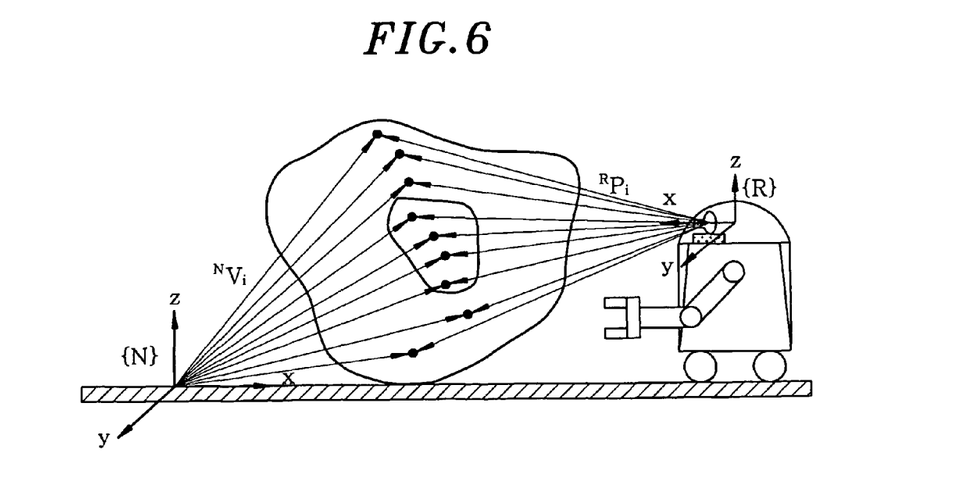
FIG. 6 shows the relationship between robot-oriented object and environment around a recognized object and environment-oriented object and environment around an object in accordance with the present invention.

FIG. 3 shows an object 410 recognized by the robot and an environment 400 around the recognized object. $^{R}P_i$ denotes, as shown in FIG. 4, a three-dimensional distance value between each of the local feature points of an object and an environment around the object and the camera unit 100. $^{N}V_i$ denotes, as shown in FIG. 5, a three-dimensional distance value between each of the local feature points of the object and the environment around the object shown in FIG. 4 and the center coordinate system of the environment map. The relationship between $^{R}P_i$ and $^{N}V_i$ is as shown in FIG. 6.

The homogenous transformation matrix of the two distance values is expressed by $^{N}_{R}T$ in Equation 1, and the relationship therebetween is expressed by Equation 2.

Therefore, if the robot can calculate $^{R}P_i$ at a position, and knows distance information $^{N}V_i$ regarding a recognized object based on the environment map and the environment around the object, $^{N}_{R}T$ can be estimated by Equation 2, and thus the position of the robot can be estimated by Equation 1. When the position of the robot is a position on a three-dimensional space, it may be expressed by $(x,y,z,\theta_x,\theta_y,\theta_z)$. If the robot operates on a plane, the expressions $z=z_c$ and $\theta_x=\theta_y=0$ are established, and the robot position is determined by $(x,y,\theta_z)$. Therefore, if the number of corresponding local feature points is 3 or more, $^{N}_{R}T$ in Equation 2 can be determined.

$$^{N}_{R}T = \begin{bmatrix} \cos(\theta_z)\cos(\theta_y) & \cos(\theta_z)\sin(\theta_y)\sin(\theta_x) - \sin(\theta_z)\cos(\theta_x) & \cos(\theta_z)\sin(\theta_y)\cos(\theta_x) + \sin(\theta_z)\sin(\theta_x) & t_x \\ \sin(\theta_z)\cos(\theta_y) & \sin(\theta_z)\sin(\theta_y)\sin(\theta_z) + \cos(\theta_z)\cos(\theta_x) & \sin(\theta_z)\sin(\theta_y)\cos(\theta_x) - \cos(\theta_z)\sin(\theta_x) & t_y \\ -\sin(\theta_y) & \cos(\theta_z)\sin(\theta_x) & \cos(\theta_z)\cos(\theta_x) & t_z \\ 0 & 0 & 0 & 1 \end{bmatrix}$$

$$= \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}$$

$$X = t_x, Y = t_y, Z = t_z$$

$$\theta_y = a\tan2\left(\sqrt{r_{31}^2 + r_{32}^2}, r_{33}\right)$$

$$\theta_z = a\tan2(r_{23}/\sin(\theta_y), r_{13}/\sin(\theta_y))$$

$$\theta_x = a\tan2(r_{32}/\sin(\theta_y), -r_{31}/\sin(\theta_y))$$

[Equation 1]

$$^{N}V_i = {^{N}_{R}T}{^{R}P_i}$$ [Equation 2]

The map, which is used to estimate the position of the robot in the robot position estimation step (S130), is stored in the database of the robot body 200. For example, as shown in FIG. 7, a topological map based on the traveling path of the robot is used.

Figure 7:
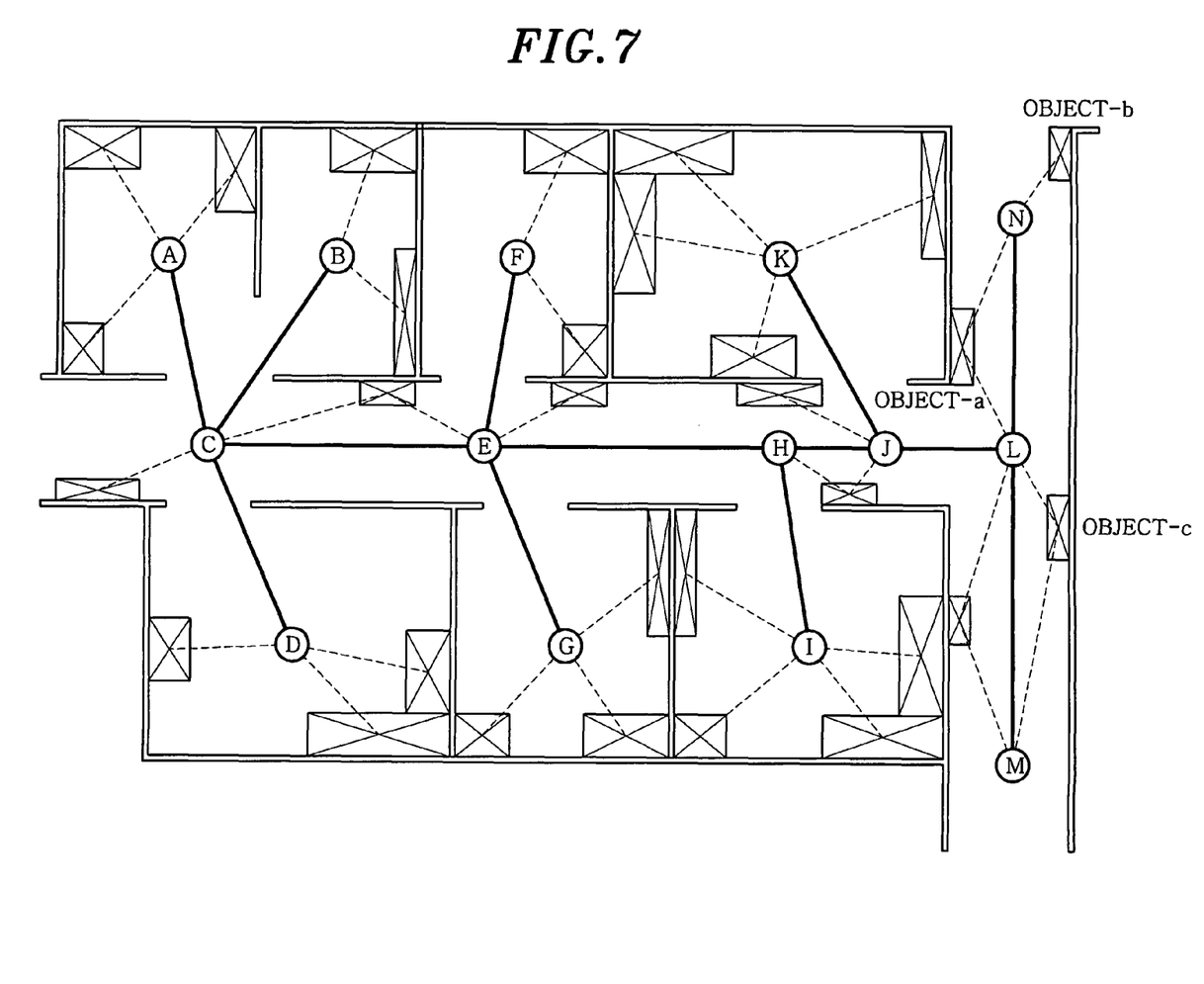
FIG. 7 shows an example of a topological map, which is used in a method for self-localization of a robot based on object recognition and an environment around a recognized object in accordance with the present invention.

In FIG. 7, A, B, C, and the like are nodes, and each node has an independent reference coordinate system. Each edge for connecting the nodes has relative distance information of each node coordinate system. In regards to such an environment map, if the robot recognizes an object and estimates its position by using the local feature points of the object and the local feature points of the environment around the object, object recognition is inaccurately performed, as compared with a case where the position is estimated based on two or more objects. In particular, a significant error occurs in the rotation angle of the robot. For this reason, in accordance with the present invention, robot position estimation is performed based on a plurality of objects.

In case of the position estimation based on the topological map and object recognition, as shown in FIG. 7, a specific object may be observed on various nodes, as well as a specific node. For example, an object a, an object b, and an object c are all observed on the nodes L and N.

That is, the fact that an object is observed does not indicate that the robot is near a node, and accordingly, it is necessary to determine a reference node for specifying the position of an object. In accordance with the present invention, in order to solve this problem, particle filtering is applied (M. Isard and A. Blake, "Condensation-Conditional Density Propagation for Visual Tracking," International Journal of Computer Vision 29(1), pp. 5 to 28, 1998).

Figure 8:
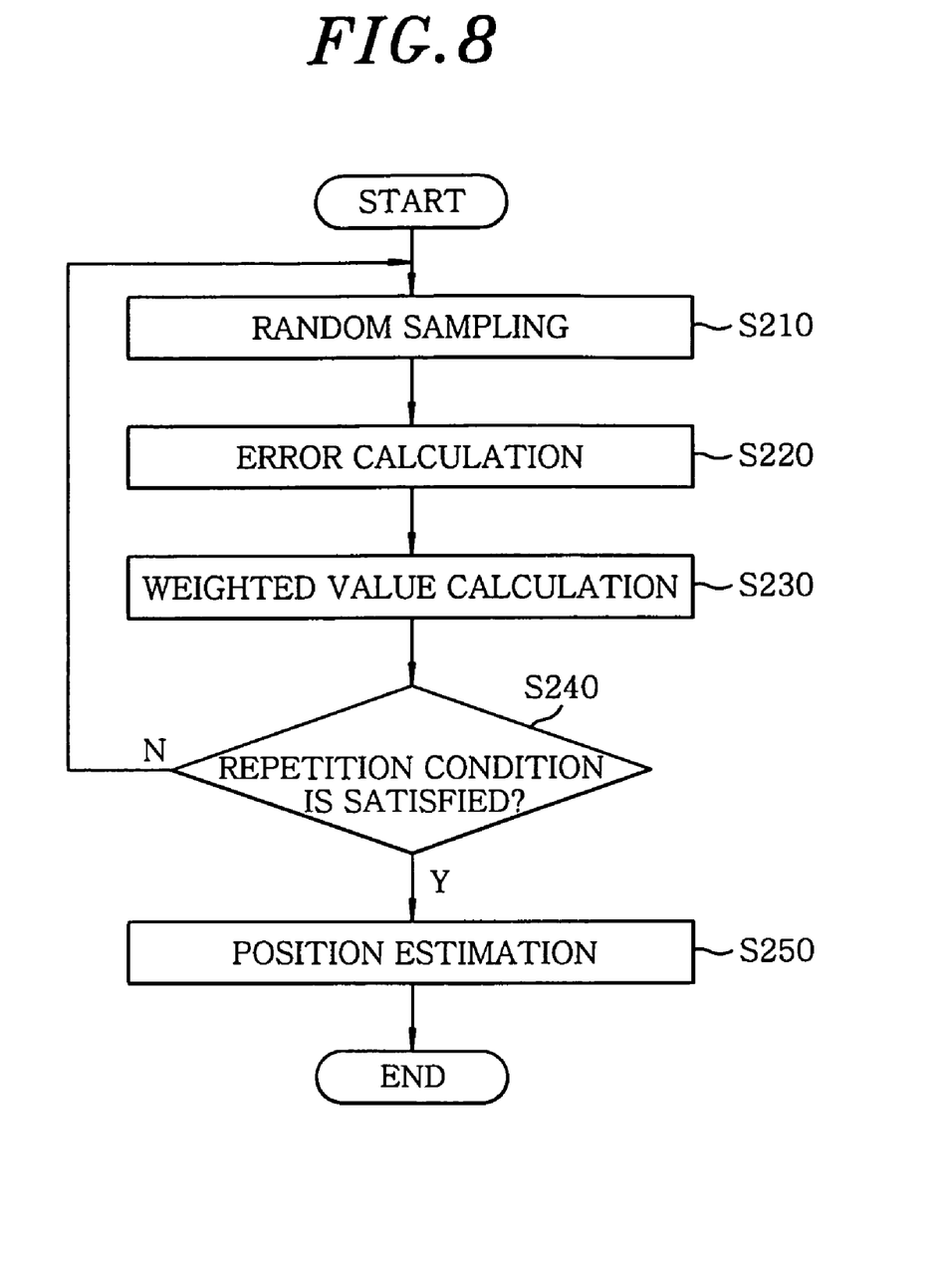
FIG. 8 is a flowchart illustrating a method for position estimation based on particle filtering.

FIG. 8 is a flowchart illustrating position estimation based on particle filtering.

The position estimation based on particle filtering includes, as shown in FIG. 8, a sampling step S210, an error calculation step S220, a weighted value calculation step S230, a repetition condition confirmation step S240, and a position estimation step S250.

If a specific object is observed, estimation is made that the robot is located at a position where the object can be observed. In the sampling step S210, random sampling is performed for the positions of the robot where the object can be observed.

In the sample step S210, let the number of repetitions and the number of a random sample be t and n, respectively.

when t=1 (an initial stage)

$$s_t'^{(n)} = (x, y, \theta)^{(n)} \quad \text{[Equation 3]}$$

Here, n is in a range of 1 to $n_s$. $n_s$ is the total number of random samples.

when t>1

A new sample collection $\{s_t^{(n)}, \pi_t^{(n)}, c_t^{(n)}\}$ of a current repetition step t is selected from a sample collection $\{s_{t-1}^{(n)}, \pi_{t-1}^{(n)}, c_{t-1}^{(n)}\}$ of a previous step t−1 as follows. Here, $\pi_t^{(n)}$ is a weighted value of a sample $s_t^{(n)}$ in the repetition step t, and $c_t^{(n)}$ is a cumulative weighted value.

(a) A number r∈[0,1] based on a uniform probability distribution is generated.
(b) For $c_{t-1}^{(j)} \geq r$, a minimum j is found.
(c) The relationship $s_t'^{(n)} = s_{t-1}^{(j)}$ is set, and Equation 4 is defined.

$$s_t'^{(n)} = (x_n, y_n, \theta_n)^{(n)} \quad \text{[Equation 4]}$$

In the error calculation step S220, an error range caused by an operation error due to the movement of the robot, a measurement error of the vision sensor, an error in object recognition, and the like is applied to a position sample generated in the sampling step S210 by using Equation 5.

$$s_t^{(n)} = A s_t'^{(n)} + B w_t^{(n)} \quad \text{[Equation 5]}$$

Here, A denotes a dynamic model of the robot. However, since position estimation is performed in a state where the robot is stationary, A is set to 1. $Bw_t^{(n)}$ denotes a robot position measurement error caused by the measurement error of the vision sensor and the error in object recognition.

In the weighted value calculation step S230, the weighted value of each random sample at the position predicted in the error calculation step S220 is calculated by Equation 6.

In Equation 6, the right side can be obtained by setting similarity between the position of each object from the environment map on an assumption that the predicted sample position is accurate, and the measurement value by the sensor. The value may be normalized so as to be $$\sum_n \pi_t^{(n)} = 1.$$

$$\pi_t^{(n)} = p(d_t | s_t^{(n)}) \quad \text{[Equation 6]}$$

The cumulative weighted value $c_t^{(n)}$ is also calculated.

$$c_t^{(1)} = 0$$

$$c_t^{(n)} = c_t^{(n-1)} + \pi_t^{(n)} \quad \text{[Equation 7]}$$

In the repetition condition confirmation step S240, it is confirmed whether or not the sampling step S210, the error calculation step S220, and the weighted value calculation step S230 are repeatedly performed until a predetermined condition is satisfied. As the repetition condition, a condition that the number of repetitions reaches a predetermined value 'T' may be used. In addition, a condition that the weighted value of a sample, which has a maximum weighted value, from among the samples in Equation 6 is equal to or more than a threshold value (for example, 0.9 when normalized) may be used. Alternatively, the steps may be configured so as to be repeatedly performed until the number of repetitions reaches the value T or the weighted value of a sample, which has a maximum weighted value, is equal to or more than a threshold value (for example, 0.9 when normalized).

If the sampling step S210, the error calculation step S220, and the weighted value calculation step S230 are repeatedly performed T times, the samples are converged to one candidate position. In the position estimation step S250, the position is estimated on the basis of a weighted average by Equation 8.

$$[s] = \sum_{n=1}^{n_s} \pi_t^{(n)} s_t^{(n)} \quad \text{[Equation 8]}$$

Here, [S] denotes the estimated position of the robot, $s_t^{(n)}$ denotes a sample of the robot position to be predicted, and $\pi_t^{(n)}$ denotes a weighted value of the sample $s_t^{(n)}$ in the repetition step t.

Figure 9:
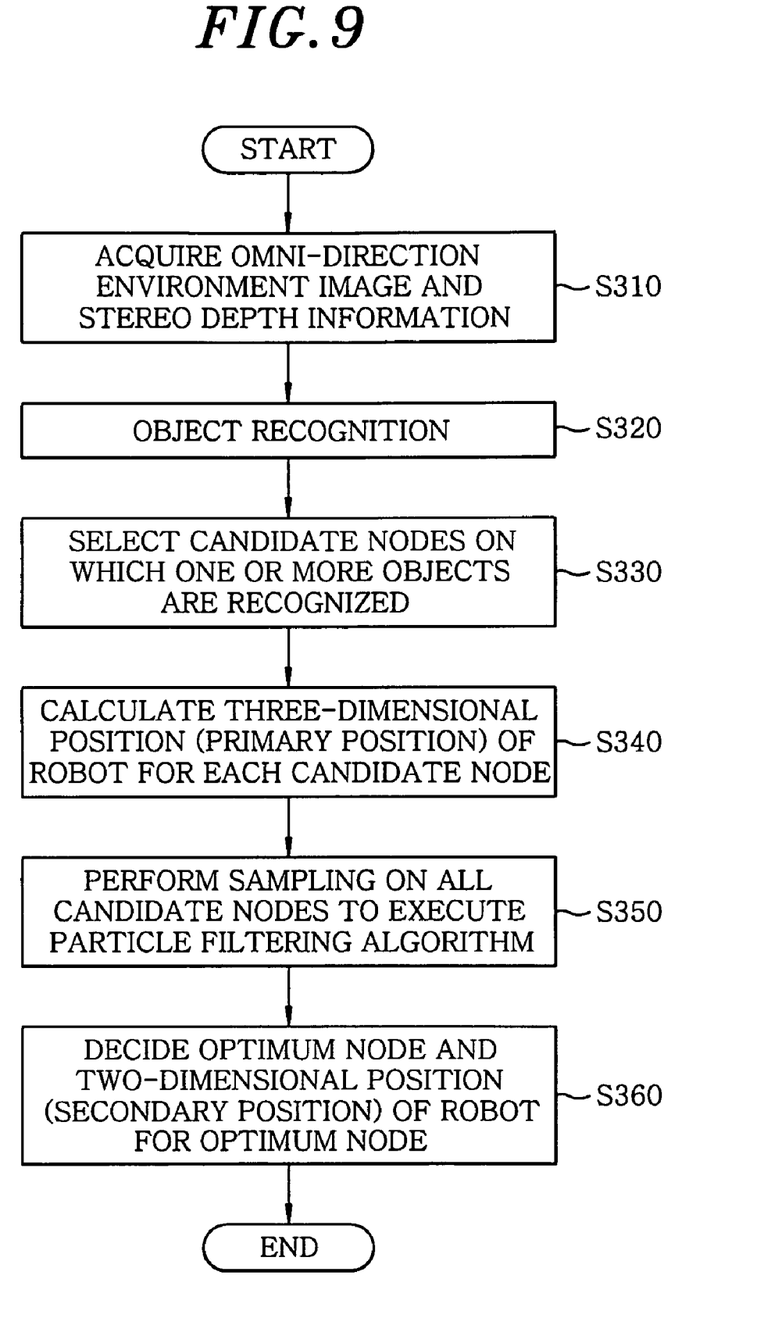
FIG. 9 is a flowchart illustrating a method for self-localization of a robot based on object recognition and an environment around a recognized object in accordance with a first embodiment of the present invention.

FIG. 9 is a flowchart illustrating a method for self-localization of a robot based on object recognition and an environment information around a recognized object in accordance with a first embodiment of the present invention.

A method for self-localization of a robot based on object recognition and environment information around a recognized object in accordance with the first embodiment of the invention is applied to a case where a sensor provided in the camera unit 100 is an omni-directional stereo vision sensor. As shown in FIG. 9, the method for self-localization of a robot in accordance with the first embodiment of the invention includes an acquisition step S310 of acquiring an omni-directional environment image and stereo depth information, an object recognition step S320, a candidate node selection step S330 of selecting candidate nodes on which one or more objects are recognized, a three-dimensional position calculation step S340 of calculating the three-dimensional positions of the robot for all the candidate nodes, a particle filtering step S350 of performing sampling for all the candidate nodes to execute a particle filtering algorithm S350, and a two-dimensional position decision step S360 of deciding an optimum node and the two-dimensional position of the robot on the optimum node.

In the omni-directional image and stereo depth information acquisition step S310, the camera unit 100 acquires an omni-directional environment image around the robot and distance information based on stereo vision for the omni-directional environment image.

In the object recognition step S320, the position arithmetic unit extracts the local feature points of an object and an environment around the object from the omni-directional environment image acquired in the acquisition step S310. The position arithmetic unit also calculates the three-dimensional position values (based on the camera coordinate system) of the extracted local feature points using stereo distance information, and compares the local feature points with the local feature points of an object model stored in the database of the robot body 200. In this way, object recognition is performed.

In the candidate node selection step S330, the position arithmetic unit selects nodes, on which one or more objects are recognized in the object recognition step S320, from the map stored in the database as candidate nodes, on which the robot can be located.

In the three-dimensional position calculation step S340, the position arithmetic unit calculates temporary positions of the robot for all the candidate nodes, and calculates a node proximity weighted value on the basis of the calculated positions of the robot.

In the three-dimensional position calculation step S340, the temporary positions of the robot can be obtained by Equations 1 and 2. If the number of matched local feature points is three or more, calculation is performed by a least-squares method.

At this time, $^{N}_{R}T$ in Equation 2 represents the pose relationship $(x,y,z,\theta_x,\theta_y,\theta_z)$ of the robot coordinate system $\{R\}$ with respect to the node coordinate system $\{N\}$.

The obtained temporary positions are used as initial position values when an accurate position is finally estimated by subsequent particle filtering.

In the three-dimensional position calculation step (S340), the position arithmetic unit calculates the node proximity weighted value $\pi_V^{(N_k)}$, indicating a node around which the robot is located, from among the weighted values in Equation 6 based on a recognized object and an environment around the object.

The node proximity weighted value is calculated on the basis of an object existence weighted value, an object-environment feature weighted value, and an object-environment distance weighted value. In calculating the object-environment distance weighted value, the three-dimensional position of the robot for each candidate node is used.

The object existence weighted value varies depending on how many the objects on each candidate node overlap the objects recognized by the robot, and is calculated by Equation 9.

$$\pi_E^{(N_k)} = \frac{n(E^{(R)} \cap E^{(N_k)})}{\sum_{k=1}^{n_N} n(E^{(R)} \cap E^{(N_k)})} = \frac{n_E^{(R \cap N_k)}}{\sum_{k=1}^{n_N} n_E^{(R \cap N_k)}}$$ [Equation 9]

Here, $\pi_E^{(N_k)}$ is an object existence weighted value of a candidate node $N_k$, and $n_N$ is the number of candidate nodes. $E^{(R)}$ is a collection of objects recognized by the robot, $E^{(N_k)}$ is a collection of objects on the candidate node $N_k$, and $n_E^{(R \cap N_k)}$ is the number of same objects from among the objects recognized by the robot and the objects on the candidate node $N_k$.

The object-environment feature weighted value represents how much the local feature points of an object model on each candidate node and the local feature points of an environment model extracted from the environment around the object are matched with the local feature points of an object recognized by the robot and the environment around the object (for example, the number of matched local feature points, or the like). The object-environment feature weighted value is calculated by Equation 10.

$$\pi_F^{(N_k)} = \frac{n((F^{(R)} \cap F^{(N_k)}))}{\sum_{k=1}^{n_N} n((F^{(R)} \cap F^{(N_k)}))} = \frac{n_F^{(R \cap N_k)}}{\sum_{k=1}^{n_N} n_F^{(R \cap N_k)}}$$ [Equation 10]

Here, $\pi_F^{(N_k)}$ is an object-environment feature weighted value of a candidate node $N_k$, $F^{(R)}$ is a collection of the local feature points of all objects recognized by the robot and the local feature points of the environment around the objects, and $F^{(N_k)}$ is a collection of the local feature points of objects on the candidate node $N_k$ and the local feature points of the environment around the objects. $n_F^{(R)}$ is the total number of local feature points of all objects recognized by the robot and the environment around the objects. $n_F^{(R \cap N_k)}$ is the number of matched local feature points between the local feature points of all objects recognized by the robot and the environment around the objects, and the local feature points of the same objects on the candidate node $N_k$ as the objects recognized by the robot and the environment around the objects.

The three-dimensional values of the local feature points of an object recognized by the robot and the environment around the object are fitted to the three-dimensional values of the local feature points of the same object on a candidate node and the environment around the object. The object-environment distance weighted value represents a distance difference between the three-dimensional values of the fitted local feature points and the three-dimensional values of the same local feature points on the candidate node. The object-environment distance weighted value is calculated by Equation 11.

$$\pi_D^{(N_k)} = \frac{(1+\bar{d}^{(N_k)})^{-1}}{\sum_{k=1}^{n_N}(1+\bar{d}^{(N_k)})^{-1}}$$ [Equation 11]

$$\bar{d}^{(N_k)} = \frac{1}{n_F^{(N_K \cap R)}} \sum_{f=1}^{n_F^{(N_K \cap R)}} d_f^{(N_K)}$$

Here, $\pi_D^{(N_k)}$ is an object-environment distance weighted value of the candidate node $N_k$, and $d_f^{(N_k)}$ is a distance difference between the three-dimensional values of the fitted local feature points and the three-dimensional values of the same local feature points on the candidate node.

The node proximity weighted value represents how much the robot is proximate to the candidate node. The node proximity weighted value is calculated by Equation 12 on the basis of the object existence weighted value, the object-environment feature weighted value, and the object-environment distance weighted value calculated by Equations 9, 10, and 11, respectively.

$$\pi_V^{(N_k)} = \frac{\pi_E^{(N_k)} + \pi_F^{(N_k)} + \pi_D^{(N_k)}}{\sum_{k=1}^{n_N} \left(\pi_E^{(N_k)} + \pi_F^{(N_k)} + \pi_D^{(N_k)}\right)} \qquad \text{[Equation 12]}$$

$$= \frac{1}{3}\left(\pi_E^{(N_k)} + \pi_F^{(N_k)} + \pi_D^{(N_k)}\right)$$

Here, $\pi_V^{(N_k)}$ is a node proximity weighted value of the robot for a node $N_k$.

In the particle filtering step S350, the position arithmetic unit performs the sampling step S210, the error calculation step S220, the weighted value calculation step S230, and the repetition condition confirmation step S240 of the particle filtering algorithm shown in FIG. 7 for the temporary positions of all the candidate nodes calculated in the three-dimensional position calculation step S340. In this way, a final weighted value required for accurate position estimation is calculated.

When the particle filtering algorithm is applied in the particle filtering step S350, the node proximity weighted value $\pi_V^{(N_k)}$ calculated in the three-dimensional position calculation step S340 and a three-dimensional feature point weighted value $\pi_P^{(n)}$ of a sample $s_t^{(n)}$ according to a distance difference between the three-dimensional feature points of an object recognized by the robot and the environment around the object and the three-dimensional feature points of the same object on a candidate node and the environment around the object are combined, as expressed by Equation 13. In this way, a final weighted value $\pi^{(n)}$ of the sample $s_t^{(n)}$ is obtained.

$$\pi^{(n)} = \frac{\pi_P^{(n)} \times \pi_V^{(N_k)}}{\sum_{k=1}^{n_N}\sum_{n=1}^{n_s} \left(\pi_P^{(n)} \times \pi_V^{(N_k)}\right)} \qquad \text{[Equation 13]}$$

In order to obtain the three-dimensional feature point weighted value, the position of a random sample $s_t^{(n)}$ on the candidate node $N_k$ is expressed in the form of a three-dimensional homogeneous transformation matrix as follows.

$$^{N_k}_{S_n}T = \begin{bmatrix} \cos\theta_n & -\sin\theta_n & 0 & x_n \\ \sin\theta_n & \cos\theta_n & 0 & y_n \\ 0 & 0 & 1 & z_c \\ 0 & 0 & 0 & 1 \end{bmatrix}$$

The three-dimensional feature points $^R P_i$ of an object recognized by the robot and an environment image around the object are transformed to the values for the candidate node $N_k$ by Equation 14 as follows.

$$^{N_k}P_i = {}^{N_k}_{S_n}T \, {}^R P_i \qquad \text{[Equation 14]}$$

Next, the distance difference between the three-dimensional feature points $^{N_k}P_i$ transformed by Equation 14 and the three-dimensional feature points $^{N_k}V_i$ of the same object on the candidate node $N_k$ and the environment image around the object is calculated by Equation 15.

$$d_i = \|{}^{N_k}V_i - {}^{N_k}P_i\| \qquad \text{[Equation 15]}$$

The three-dimensional feature point weighted value $\pi_P^{(n)}$ of the sample $s_t^{(n)}$ according to the distance difference between the three-dimensional feature points of the object recognized by the robot and the environment around the object and the three-dimensional feature points of the same object on the candidate node and the environment around the object is calculated by Equation 16.

$$\pi_P^{(n)} = \frac{\left(1 + \overline{d}^{(n)}\right)^{-1}}{\sum_{n=1}^{n_s}\left(1 + \overline{d}^{(n)}\right)^{-1}} \qquad \text{[Equation 16]}$$

$$\overline{d}^{(n)} = \frac{1}{n_F}\sum_{i=1}^{n_F} d_i$$

Here, $n_F$ is the number of matched local feature points between the local feature points of all objects recognized by the robot and the environment around the objects and the local feature points of the same objects as the objects recognized by the robot from among the objects on the candidate node $N_k$ and the environment around the objects.

The two-dimensional position decision step S360 is identical to the position estimation step S250 of FIG. 8. That is, in the two-dimensional position decision step S360, the position of the robot is estimated on the basis of only the samples on a node, on which samples are most converged, by Equation 8.

Figure 10:
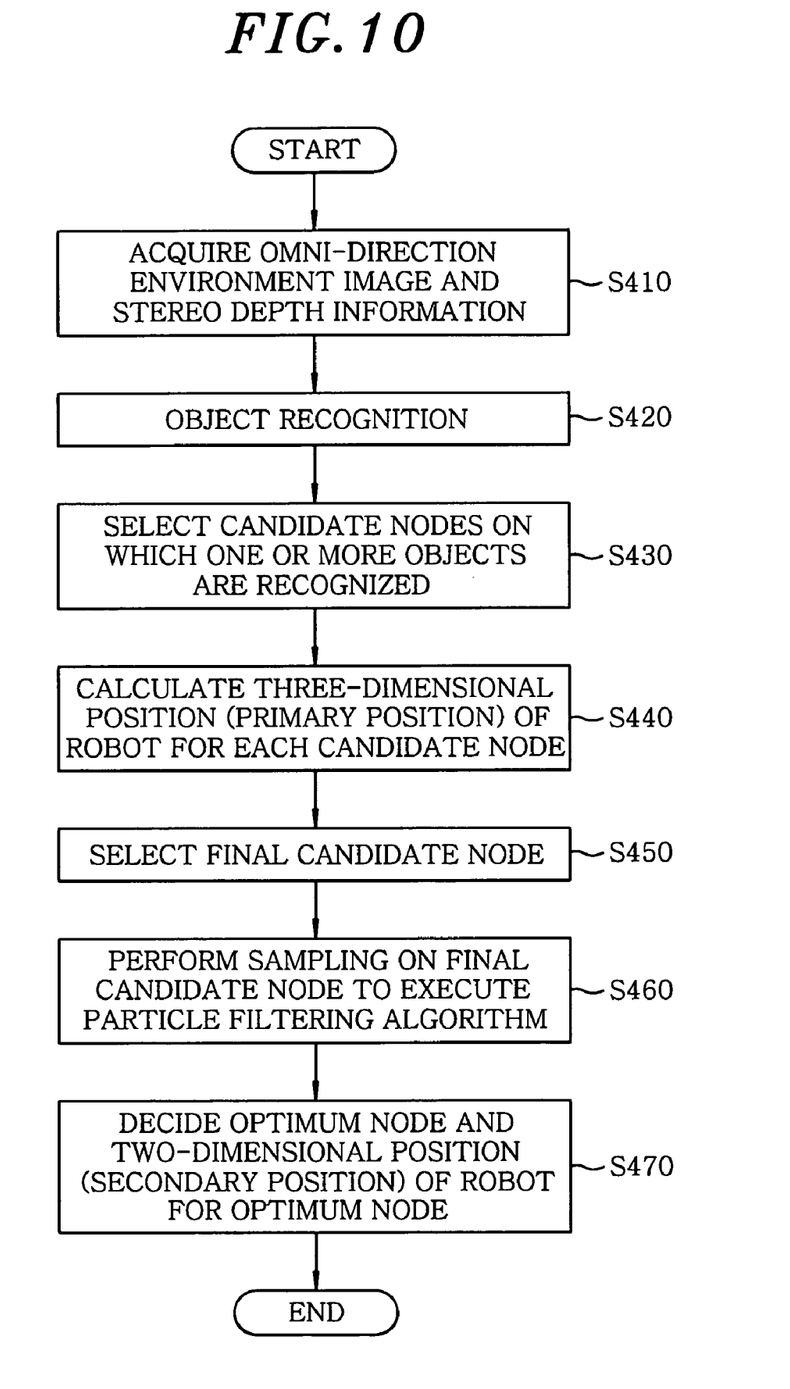
FIG. 10 is a flowchart illustrating a method for self-localization of a robot based on object recognition and an environment around a recognized object in accordance with a second embodiment of the present invention.

FIG. 10 is a flowchart illustrating a method for self-localization of a robot based on object recognition and the environment around a recognized object in accordance with a second embodiment of the present invention.

A method for self-localization of a robot based on object recognition and the environment around a recognized object in accordance with the second embodiment of the present invention is applied to a case where a sensor provided in the camera unit 100 is an omni-directional stereo vision sensor, and a final node on which the robot is located is predefined. As shown in FIG. 10, the method for self-localization of a robot in accordance with the second embodiment of the present invention includes an acquisition step S410 of acquiring an omni-directional environment image and stereo depth information, an object recognition step S420, a candidate node selection step S430 of selecting candidate nodes on which one or more objects are recognized, a three-dimensional position calculation step S440 of calculating the three-dimensional positions of the robot for all the candidate nodes, a final candidate node selection step S450, a particle filtering step S460 of performing sampling for the final candidate node to execute a particle filtering algorithm, and a two-dimensional position decision step S470 of deciding an optimum node and the two-dimensional position of the robot for the optimum node.

The acquisition step S410, the object recognition step S420, and the candidate node selection step S430, and the three-dimensional position calculation step S440 are the same as the acquisition step S310, the object recognition step S320, the candidate node selection step S330, and the three-dimensional position calculation step S340, respectively, and thus detailed descriptions thereof will be omitted.

In the final candidate node selection step S450, a node having a maximum node proximity weighted value calculated in the three-dimensional position calculation step S440 is selected as the final candidate node.

In the particle filtering step S460, the position arithmetic unit performs the sampling step S210, the error calculation step S220, the weighted value calculation step S230, and the repetition condition confirmation step S240 for the final candidate node selected in the final candidate node selection step S450. In this way, a final weighted value required for accurate position estimation is calculated.

In the two-dimensional position decision step S470, Equation 8 is applied to the node that is selected in the final candidate node selection step S450, and the final weighted value of which is calculated in the particle filtering step S460. In this way, the position of the robot is estimated.

Figure 11A:
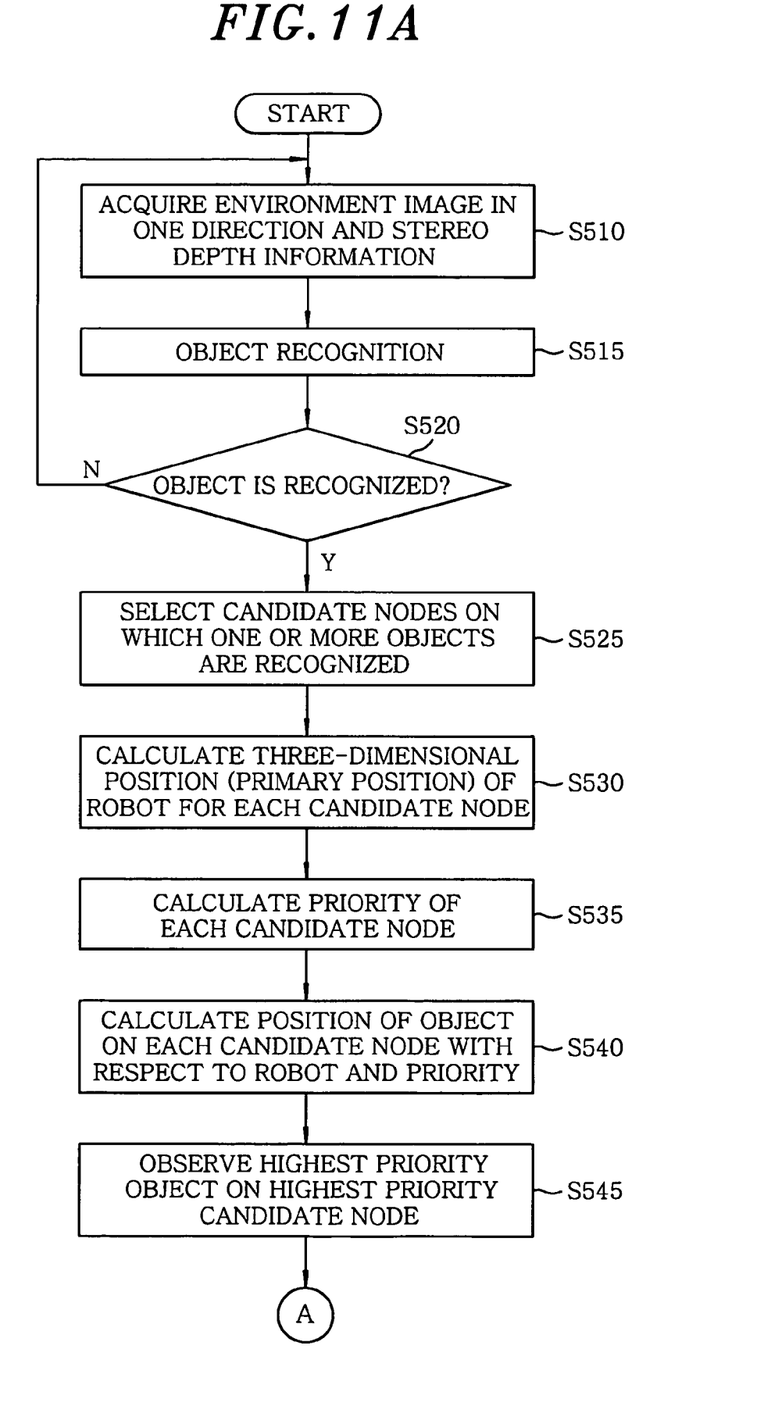
FIGS. 11A and 11B are flowcharts illustrating a method for self-localization of a robot based on object recognition and an environment around a recognized object in accordance with a third embodiment of the present invention.
Figure 11B:
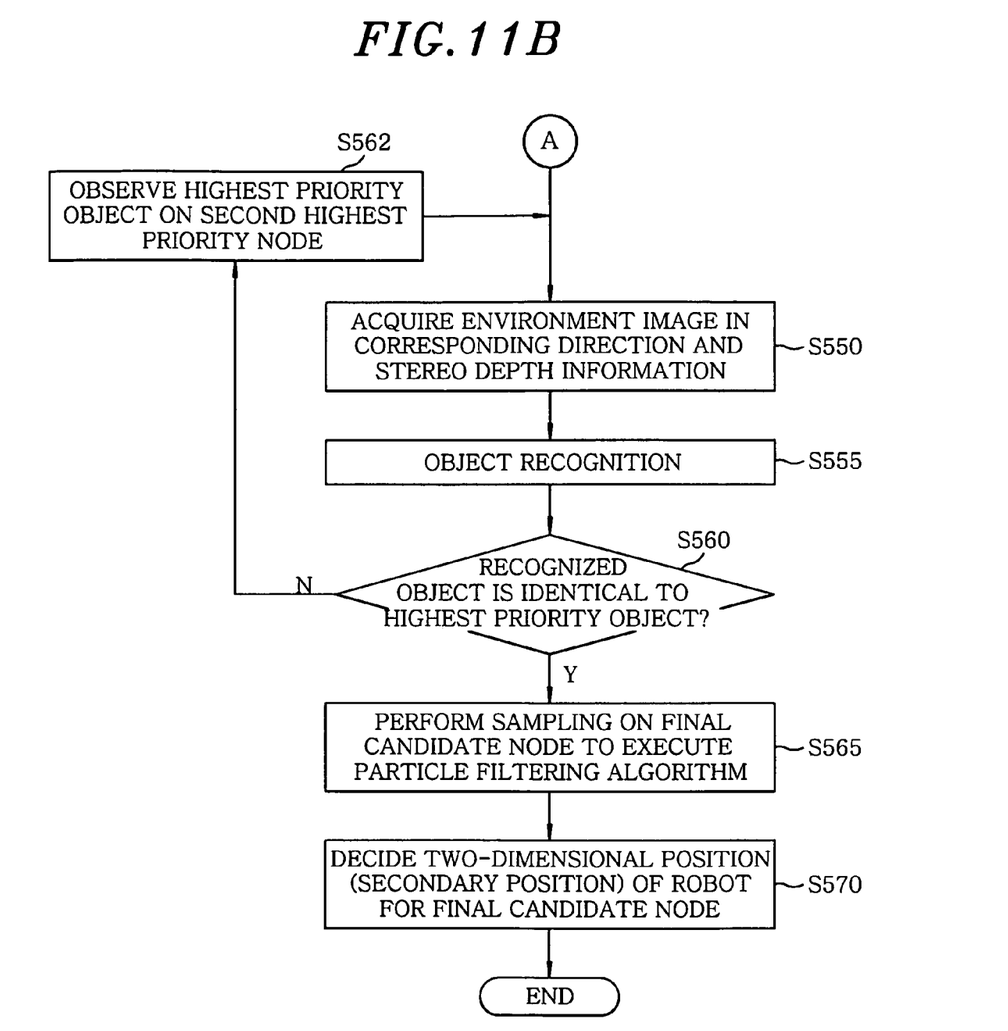

FIGS. 11A and 11B are flowcharts illustrating a method for self-localization of a robot based on object recognition and an environment around a recognized object in accordance with a third embodiment of the present invention.

A method for self-localization of a robot based on object recognition and the environment around a recognized object in accordance with the third embodiment of the present invention is applied to a case where a sensor provided in the camera unit 100 is a stereo camera having a viewing angle in a predetermined range, not 360°, and the position of the robot is estimated by recognition of two-objects in the environment in order to reduce a position estimation time of the robot. As shown in FIGS. 11A and 11B, the method for self-localization of a robot in accordance with the third embodiment of the present invention includes an acquisition step S510 of acquiring an environment image in a direction and stereo depth information, an object recognition step S515, a confirmation step S520 of confirming whether or not an object is recognized, a candidate node selection step S525 of selecting candidate nodes on which one or more objects are recognized, a three-dimensional position calculation step S530 of calculating the three-dimensional positions of the robot for all the candidate nodes, a priority calculation step S535 of calculating the priority of each candidate node, a position and priority calculation step S540 of calculating the positions of objects on the candidate nodes with respect to the robot and the priority of each object, an observation step S545 of observing a highest priority object on a highest priority candidate node, an acquisition step S550 of acquiring an environment image in the observation direction and stereo depth information, an object recognition step S555, a confirmation step S560 of confirming whether or not a recognized object is identical to the highest priority object, an observation step S562 of observing a highest priority object on a second highest priority candidate node, a particle filtering step S565 of performing sampling for a final node to execute a particle filtering algorithm, and a two-dimensional position decision step S570 of deciding the two-dimensional position of the robot for the final node.

In the acquisition step S510, the camera unit 100 acquires an environment image in a turn direction thereof, and distance information based on stereo vision for the environment image are acquired.

In the object recognition step S515, the position arithmetic unit extracts the local feature points of an object and the environment around the object from the environment image acquired in the acquisition step S510. The position arithmetic unit also obtains the three-dimensional position values (based on the camera coordinate system) of the extracted local feature point on the basis of the stereo distance information, and compares the extracted local feature points with the local feature points of an object model stored in the database of the robot body 200, thereby recognizing the object.

In the confirmation step S520, the position arithmetic unit confirms whether an object is recognized in the object recognition step S515 or not. If no object is recognized, the pan/tilt device 110 is operated, and the camera unit 110 is pinned to turn in another direction.

In the candidate node selection step S525, the position arithmetic unit selects nodes, on which one or more objects are recognized in the object recognition step S515, from the map stored in the database as candidate nodes, on which the robot can be located.

The three-dimensional position calculation step S530 is the same as the three-dimensional position calculation step S340 in the first embodiment, and a detailed description thereof will be omitted.

In the priority calculation step S535, the priority of each node is calculated on the basis of the node proximity weighted value calculated in the three-dimensional position calculation step S530.

In the position and priority calculation step S540, the position arithmetic unit calculates the positions of the objects on the candidate nodes, on which one or more objects are recognized, selected in the candidate node selection step S525, and decides an object, which is closest to the temporary position of the robot, as a verified object.

In the observation step S545, the position arithmetic unit operates the pan/tilt device 110 to pan the camera unit 100 in a direction, in which the verified object selected in the position and priority calculation step S540 is predicted to be present.

In the observation step S545, the position arithmetic unit operates the pan/tilt device 110 to enable the camera to be panned left and right or to be tilted up and down.

In the acquisition step S550, the camera unit 100 acquires an environment image in a direction, in which it turns, and distance information based on stereo vision for the environment image.

In the object recognition step S555, the position arithmetic unit extracts the local feature points from the environment image acquired in the acquisition step S550, and compares the extracted local feature points with the local feature points of an object model corresponding to the highest priority object stored in the database of the robot body 200, thereby recognizing an object.

In the confirmation step S560, the position arithmetic unit compares the object recognized in the object recognition step S555 with the verified object selected in the position and priority calculation step S540, and if both are the same, selects the corresponding candidate node as the final node.

In the observation step S562, if it is determined in the confirmation step S560 that the recognized object is identical to the highest priority object, the position arithmetic unit moves the camera unit 100 to a verified object selected by the position and priority calculation step S540, in which the positions of objects on a second highest priority candidate node selected in the priority calculation step S535 and the priority of each object are calculated.

For example, when the candidate nodes are two nodes A and B, and the priority is given in an order of the nodes A and B, the highest priority node is the node A. If the objects on the node A, excluding the recognized object, are objects a1, b1, and c1, and the priority is given in an order of the objects a1, b1, and c1, the robot turns in a direction in which the object a1 is predicted to be present, and object recognition is performed. If the object a1 is not recognized, the robot turns toward the highest priority object on the second highest priority candidate node B, and object recognition is performed.

In the particle filtering step S565, the position arithmetic unit performs the sampling step S210, the error calculation step S220, the weighted value calculation step S230, and the repetition condition confirmation step S240 in the particle filtering algorithm of FIG. 8 for the final node selected in the confirmation step S560. In this way, a final weighted value required for accurate position estimation is calculated.

In the two-dimensional position decision step S570, Equation 8 is applied to the node, which is selected in the confirmation step S560 and the final weighted value of which is calculated in the particle filtering step S565. In this way, the position of the robot is estimated.

While the invention has been shown and described with respect to the embodiment, it will be understood by those skilled in the art that various changes and modifications may be made without departing from the scope of the invention as defined in the following claims.

What is claimed is:

1. A method for self-localization of a robot, the robot including a camera unit formed of a stereo video device, a database storing a map around a robot traveling path, and a position arithmetic unit estimating the position of the robot on the basis of image information acquired by the camera unit, the method comprising:

acquiring an image around the robot in the camera unit;

recognizing, in the position arithmetic unit, an individual object in the image acquired by the camera unit, to generate position values on a camera coordinate system of local feature points of the individual objects and local feature points of a surrounding environment including the individual objects; and estimating, in the position arithmetic unit, the position of the robot on the basis of the map stored in the database and the position values on the camera coordinate system of local feature points of the individual objects and local feature points of a surrounding environment including the individual objects.

2. The method of claim 1, wherein estimating the position of the robot includes:

selecting nodes, on which at least recognized object is included, from the map stored in the database as candidate nodes, wherein the robot can be located on the candidate node;

calculating temporary positions of the robot for all the candidate nodes on the basis of the position values; and applying particle filtering to each candidate node with the calculated temporary position as an initial position value to estimate the position of the robot.

3. The method of claim 2, wherein the temporary positions of the robot are calculated by Equations 1 and 2, $$
{}^N_R T = \begin{bmatrix} \cos(\theta_z)\cos(\theta_y) & \cos(\theta_z)\sin(\theta_y)\sin(\theta_x) - \sin(\theta_z)\cos(\theta_x) & \cos(\theta_z)\sin(\theta_y)\cos(\theta_x) + \sin(\theta_z)\sin(\theta_x) & t_x \\ \sin(\theta_z)\cos(\theta_y) & \sin(\theta_z)\sin(\theta_y)\sin(\theta_z) + \cos(\theta_z)\cos(\theta_x) & \sin(\theta_z)\sin(\theta_y)\cos(\theta_x) - \cos(\theta_z)\sin(\theta_x) & t_y \\ -\sin(\theta_y) & \cos(\theta_z)\sin(\theta_x) & \cos(\theta_z)\cos(\theta_x) & t_z \\ 0 & 0 & 0 & 1 \end{bmatrix}
$$

$$
= \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}
$$

[Equation 1]

$${}^N V_i = {}^N_R T {}^R P_i$$ [Equation 2]

where, ${}^R P_i$ and ${}^N V_i$ are a position value on the camera coordinate system and a position value on an environment map-based coordinate system of local feature points of the same object and the environment around the same object, respectively, ${}^N_R T$ is a homogenous transformation matrix of the two position values, and the position of the robot can be expressed by $(x,y,z,\theta_x,\theta_y,\theta_z)$, and wherein the position estimation step comprises:

calculating a final weighted value to apply the final weighted value to particle filtering; and estimating the position of the robot by executing Equation 8 on the basis of only samples of a node, on which samples are most converged, $$[s] = \sum_{n=1}^{n_s} \pi_t^{(n)} s_t^{(n)}$$ [Equation 8]

where, $[S]$ is the estimated position of the robot, $s_t^{(n)}$ is a sample of the robot position to be predicted, $\pi_t^{(n)}$ is a weighted value of a sample $s_t^{(n)}$ in a repetition step t, and $n_s$ is the total number of random samples.

4. The method of claim 3, wherein the final weighted value is calculated by Equation 13 on the basis of the node proximity weighted value $\pi_V^{(N_k)}$ indicating a node, around which the robot is located, and a three-dimensional feature point weighted value $\pi_P^{(n)}$ of the sample $s_t^{(n)}$ according to a distance difference between the three-dimensional feature points of an object recognized by the robot and the environment around the object and the three-dimensional feature points of the same object on a node and the environment around the object, $$\pi^{(n)} = \frac{\pi_P^{(n)} \times \pi_V^{(N_k)}}{\sum_{k=1}^{n_N} \sum_{n=1}^{n_s} (\pi_P^{(n)} \times \pi_V^{(N_k)})}$$ [Equation 13]

where, $\pi^{(n)}$ is a final weighted value, and $n_N$ is the number of candidate nodes.

5. The method of claim 4, wherein the node proximity weighted value $\pi_V^{(N_k)}$ is determined by Equation 12, $$\pi_V^{(N_k)} = \frac{\pi_E^{(N_k)} + \pi_F^{(N_k)} + \pi_D^{(N_k)}}{\sum_{k=1}^{n_N} (\pi_E^{(N_k)} + \pi_F^{(N_k)} + \pi_D^{(N_k)})}$$ [Equation 12]

-continued $$= \frac{1}{3}\left(\pi_E^{(N_k)} + \pi_F^{(N_k)} + \pi_D^{(N_k)}\right)$$

where, $\pi_V^{(N_k)}$ is a node proximity weighted value of the robot for a node $N_k$, $\pi_E^{(N_k)}$ is an object existence weighted value of the node $N_k$, $\pi_F^{(N_k)}$ is an object-environment feature weighted value of the node $N_k$, $\pi_D^{(N_k)}$ is an object-environment distance weighted value of the node $N_k$, and $n_N$ is the number of candidate nodes.

6. The method of claim 5, wherein the object existence weighted value $\pi_E^{(N_k)}$ is calculated by Equation 9, $$\pi_E^{(N_k)} = \frac{n(E^{(R)} \cap E^{(N_k)})}{\sum_{k=1}^{n_N} n(E^{(R)} \cap E^{(N_k)})} = \frac{n_E^{(R \cap N_k)}}{\sum_{k=1}^{n_N} n_E^{(R \cap N_k)}} \quad \text{[Equation 9]}$$

where, $\pi_E^{(N_k)}$ is an object existence weighted value of a node $N_k$, $E^{(R)}$ is a collection of objects recognized by the robot, $E^{(N_k)}$ is a collection of objects on the node $N_k$, and $n_E^{(R \cap N_k)}$ is the number of same objects from among the objects recognized by the robot and the objects on the node $N_k$.

7. The method of claim 5, wherein the object-environment feature weighted value $\pi_F^{(N_k)}$ is calculated by Equation 10, $$\pi_F^{(N_k)} = \frac{n((F^{(R)} \cap F^{(N_k)}))}{\sum_{k=1}^{n_N} n((F^{(R)} \cap F^{(N_k)}))} = \frac{n_F^{(R \cap N_k)}}{\sum_{k=1}^{n_N} n_F^{(R \cap N_k)}} \quad \text{[Equation 10]}$$

where, $\pi_F^{(N_k)}$ is an object-environment feature weighted value of a node $N_k$, $F^{(R)}$ is a collection of the local feature points of all objects recognized by the robot and the local feature points of the environment around the objects, $F^{(N_k)}$ is a collection of the local feature points of objects on the node $N_k$ and the local feature points of the environment around the objects, $n_F^{(R \cap N_k)}$ is the number of matched local feature points between the local feature points of all objects recognized by the robot and the environment around the objects and the local feature points of the same objects on the node $N_k$ as the objects recognized by the robot and the environment around the objects.

8. The method of claim 5, wherein the object-environment distance weighted value $\pi_D^{(N_k)}$ is calculated by Equation 11, $$\pi_D^{(N_k)} = \frac{\left(1 + \overline{d}^{(N_k)}\right)^{-1}}{\sum_{k=1}^{n_N} \left(1 + \overline{d}^{(N_k)}\right)^{-1}} \quad \text{[Equation 11]}$$

$$\overline{d}^{(N_k)} = \frac{1}{n_F^{(N_K \cap R)}} \sum_{f=1}^{n_F^{(N_K \cap R)}} d_f^{(N_K)}$$

where, $\pi_D^{(N_k)}$ is an object-environment distance weighted value of a node $N_k$, and $d_f^{(N_k)}$ is a distance difference between the three-dimensional values of the fitted local feature points and the three-dimensional values of the same local feature points on the candidate node when the three-dimensional values of the local feature points of an object recognized by the robot and the environment around the object are fitted to the three-dimensional values of the local feature points of the same object on the candidate node and the environment around the object.

9. The method of claim 1, wherein estimating the position of the robot includes:
selecting nodes, on which at least recognized object is included, from the map stored in the database as candidate nodes,
wherein the robot can be located on the candidate node;
calculating temporary positions of the robot for all the candidate nodes on the basis of the position values;
selecting a final candidate node from among the candidate nodes; and
applying particle filtering to the final candidate node with the temporary position of the robot for the final candidate node as an initial position value to estimate the position of the robot.

10. The method of claim 9, wherein the temporary positions of the robot are calculated by Equations 1 and 2, $$_R^N T = \begin{bmatrix} \cos(\theta_z)\cos(\theta_y) & \cos(\theta_z)\sin(\theta_y)\sin(\theta_x) - \sin(\theta_z)\cos(\theta_x) & \cos(\theta_z)\sin(\theta_y)\cos(\theta_x) + \sin(\theta_z)\sin(\theta_x) & t_x \\ \sin(\theta_z)\cos(\theta_y) & \sin(\theta_z)\sin(\theta_y)\sin(\theta_z) + \cos(\theta_z)\cos(\theta_x) & \sin(\theta_z)\sin(\theta_y)\cos(\theta_x) - \cos(\theta_z)\sin(\theta_x) & t_y \\ -\sin(\theta_y) & \cos(\theta_z)\sin(\theta_x) & \cos(\theta_z)\cos(\theta_x) & t_z \\ 0 & 0 & 0 & 1 \end{bmatrix}$$

$$= \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}$$

[Equation 1]

$$^N V_i = {^N_R T}\, ^R P_i \quad \text{[Equation 2]}$$

where, $^R P_i$ and $^N V_i$ are a position value on the camera coordinate system and a position value on an environment map-based coordinate system of local feature points of the same object and the environment around the same object, respectively, $^N_R T$ is a homogenous transformation matrix of the two position values, and the position of the robot can be expressed by $(x,y,z,\theta_x,\theta_y,\theta_z)$, and
wherein the position estimation step comprises:
calculating a final weighted value to apply the final weighted value to particle filtering; and estimating the position of the robot by executing Equation 8, $$[s] = \sum_{n=1}^{n_s} \pi_t^{(n)} s_t^{(n)}$$ [Equation 8]

where, [S] is the estimated position of the robot, $s_t^{(n)}$ is a sample of the robot position to be predicted, $\pi_t^{(n)}$ is a weighted value of a sample $s_t^{(n)}$ in a repetition step t, and $n_s$ is the total number of random samples.

11. The method of claim 10, wherein the final weighted value is calculated by Equation 13 on the basis of the node proximity weighted value $\pi_V^{(N_k)}$ indicating a node, around which the robot is located, and a three-dimensional feature point weighted value $\pi_P^{(n)}$ of the sample $s_t^{(n)}$ according to a distance difference between the three-dimensional feature points of an object recognized by the robot and the environment around the object and the three-dimensional feature points of the same object on a node and the environment around the object, $$\pi^{(n)} = \frac{\pi_P^{(n)} \times \pi_V^{(N_k)}}{\sum_{k=1}^{n_N} \sum_{n=1}^{n_s} \left(\pi_P^{(n)} \times \pi_V^{(N_k)}\right)}$$ [Equation 13]

where, $\pi^{(n)}$ is a final weighted value, and $n_N$ is the number of candidate nodes.

12. The method of claim 9, wherein the final candidate node is a node, which has a maximum node proximity weighted value from among node proximity weighted values calculated by Equation 12 for the candidate nodes, $$\pi_V^{(N_k)} = \frac{\pi_E^{(N_k)} + \pi_F^{(N_k)} + \pi_D^{(N_k)}}{\sum_{k=1}^{n_N} \left(\pi_E^{(N_k)} + \pi_F^{(N_k)} + \pi_D^{(N_k)}\right)}$$

$$= \frac{1}{3}\left(\pi_E^{(N_k)} + \pi_F^{(N_k)} + \pi_D^{(N_k)}\right)$$ [Equation 12]

where, $\pi_V^{(N_k)}$ is a node proximity weighted value of the robot for a node $N_k$, $\pi_E^{(N_k)}$ is an object existence weighted value of the node $N_k$, $\pi_F^{(N_k)}$ is an object-environment feature weighted value of the node $N_k$, $\pi_D^{(N_k)}$ is an object-environment distance weighted value of the node $N_k$, and $n_N$ is the number of candidate nodes.

* * * * *